US007297733B2

(12) United States Patent
Negele et al.

(10) Patent No.: US 7,297,733 B2
(45) Date of Patent: Nov. 20, 2007

(54) AQUEOUS DISPERSIONS OF WATER-SOLUBLE POLYMERS OF N-VINYLCARBOXAMIDES, THEIR PREPARATION AND THEIR USE

(75) Inventors: Anton Negele, Deidesheim (DE); Werner Gauweiler, Lustadt (DE); Hubert Meixner, Ludwigshafen (DE); Norbert Mahr, Limburgerhof (DE); Martin Ruebenacker, Altrip (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 17 days.

(21) Appl. No.: 11/328,171

(22) Filed: Jan. 10, 2006

(65) Prior Publication Data

US 2006/0116448 A1    Jun. 1, 2006

Related U.S. Application Data

(62) Division of application No. 09/830,566, filed as application No. PCT/EP99/08284 on Oct. 30, 1999, now Pat. No. 7,034,068.

(30) Foreign Application Priority Data

Nov. 5, 1998    (DE) ................. 198 51 024

(51) Int. Cl.
  C08L 29/04    (2006.01)
  C08L 89/00    (2006.01)
(52) U.S. Cl. ..................... 524/45; 524/47; 524/48; 524/52; 524/503; 524/515; 524/516; 524/519; 524/521
(58) Field of Classification Search ............. 524/45, 524/47, 48, 52, 503, 515, 516, 519, 521
See application file for complete search history.

(56) References Cited

U.S. PATENT DOCUMENTS

| 3,817,896 A | 6/1974 | Bergmeister et al. |
| 5,092,935 A | 3/1992 | Crema et al. |
| 5,290,880 A | 3/1994 | Moench et al. |
| 5,591,799 A | 1/1997 | Bott et al. |
| 5,720,888 A | 2/1998 | Kuo et al. |
| 5,744,418 A | 4/1998 | Jakob |
| 5,753,753 A | 5/1998 | Phung et al. |
| 5,936,042 A | 8/1999 | Matsushima et al. |
| 5,962,570 A | 10/1999 | Sato et al. |
| 6,146,746 A | 11/2000 | Reck et al. |
| 6,426,383 B1 | 7/2002 | Fong et al. |

FOREIGN PATENT DOCUMENTS

| DE | 44 30 069 | 2/1996 |
| DE | 195 32 229 | 3/1997 |
| EP | 0 183 466 | 6/1986 |
| EP | 0 510 246 | 10/1992 |
| JP | 09-071659 | 3/1997 |
| JP | 10-007722 | 1/1998 |
| JP | 11-228704 | 8/1999 |
| WO | 97/30094 | 8/1997 |
| WO | 97/34933 | 9/1997 |
| WO | 98/54234 | 12/1998 |

OTHER PUBLICATIONS

Hiroshi Uyama, et al., Chemical Abstracts, vol. 121, No. 8, AN 1994:484100, Aug. 22, 1994, "Dispersion Polymerization of N-Vinylformamide in Polar Media. Preparation of Monodisperse Hydrophilic Polymer Particles," 1994.

Hiroshi Uyama, et al., Chemistry Letters, 1 page, "Preparation of Monodisperse Poly(N-Vinylformamide) Particles by Dispersion Polymerization in Methanol Solvent," 1993.

*Primary Examiner*—Bernard Lipman
(74) *Attorney, Agent, or Firm*—Oblon, Spivak, McClelland, Maier & Neustadt, P.C.

(57) ABSTRACT

Aqueous dispersions of water-soluble polymers of N-vinylcarboxamides contain, based on 100 parts of water,
(A) from 5 to 80 parts by weight of water-soluble polymer containing N-vinylformamide units and/or N-vinylacetamide units and having particle sizes of from 50 nm to 2 μm and
(B) from 1 to 50 parts by weight of at least one polymeric dispersant which is incompatible with the water-soluble polymers (A) in aqueous solution, which dispersions are prepared by polymerizing
  (A) from 5 to 80 parts by weight of N-vinylformamide and/or N-vinylacetamide, if desired together with other monoethylenically unsaturated monomers which form water-soluble polymers therewith, and
  (B) from 1 to 50 parts by weight of at least one polymeric dispersant which is incompatible with the polymers, formed from the monomers (A), in aqueous solution,
in 100 parts by weight of water, at from 30 to 95° C. in the presence of from 0.001 to 5.0% by weight, based on the monomers used, and the aqueous dispersions of water-soluble polymers are used as drainage aids, flocculants and retention aids and as wet and dry strength agents and as fixing compositions in papermaking.

7 Claims, No Drawings

AQUEOUS DISPERSIONS OF WATER-SOLUBLE POLYMERS OF N-VINYLCARBOXAMIDES, THEIR PREPARATION AND THEIR USE

The present application is a divisional of U.S. patent application Ser. No. 09/830,566, filed on May 7, 2001, now U.S. Pat. No. 7,034,068, which is a national stage application of PCT/EP99/08284, filed on Oct. 30, 1999, and claims priority to German patent application No. 19851024.1, filed on Nov. 5, 1998.

The present invention relates to aqueous dispersions of water-soluble polymers of N-vinylcarboxamides, processes for their preparation and their use in papermaking.

EP-A-01 83 466 discloses a process for the preparation of aqueous dispersions of water-soluble polymers, cationic monomers, for example dialkylaminoacrylamides quaternized with benzyl chloride, being polymerized in an aqueous salt solution in the presence of a polymeric dispersant. Dispersants used are, for example, polyols, polyalkylene ethers, alkali metal salts of polyacrylic acid and alkali metal salts of poly-2-acrylamido-2-methylpropane-sulfonic acid. Salt concentration in the polymerization medium is preferably from 15% by weight to the saturation limit.

DE-A-44 30 069 discloses aqueous, solvent-free dispersions of cationic polymers, which are used as sizes for paper. The polymers are prepared by free radical polymerization of cationic monomers, if desired as a mixture with other monomers in solution or dispersion or by mass polymerization.

DE-A 195 32 229 discloses a process for the preparation of low-viscosity, water-soluble polymer dispersions. In this process, water-soluble monomers, as a mixture with a crosslinkable N-methylol compound, are polymerized in aqueous solution in the presence of at least one polymeric dispersant, the resulting polymer being incompatible with the dispersant. The dispersions thus obtained are used as flocculants.

WO-A-97/30094 discloses a process for the preparation of dispersions of water-soluble cationic vinyl polymers, water-soluble, cationic hydrophobically modified vinyl monomers or water-soluble, nonionic, hydrophobic vinyl monomers being polymerized with water-soluble, cationic and/or water-soluble neutral vinyl monomers in aqueous salt solutions using a water-soluble initiator in the presence of stabilizers which consist of a graft copolymer which contains polyethylene oxide as the grafting base and grafted-on cationic vinyl monomers as side chains. WO-A 97/34933 relates to aqueous dispersions of high molecular weight, nonionic or anionic polymers which were prepared by polymerization of the monomers in a saturated salt solution with addition of an anionic, water-soluble polymer stabilizer. Preferably used monomers are acrylamide and acrylic acid.

It is an object of the present invention to provide aqueous dispersions of water-soluble polymers, which dispersions are virtually free of stabilizing inorganic salts.

We have found that this object is achieved, according to the invention, by aqueous dispersions of water-soluble polymers of N-vinylformamide and/or of N-vinylacetamide if the dispersions contain, based on 100 parts by weight of water, (A) from 5 to 80 parts by weight of a water-soluble polymer containing N-vinylformamide units and/or N-vinylacetamide units and having particle sizes of from 50 nm to 2 μm and (B) from 1 to 50 parts by weight of at least one polymeric dispersant which is incompatible with the water-soluble polymers (A) in aqueous solution.

The aqueous dispersions of water-soluble polymers preferably contain, based on 100 parts by weight of water, (A) from 10 to 50 parts by weight of a water-soluble polymer containing N-vinylformamide units and/or N-vinylacetamide units and (B) from 5 to 40 parts by weight of at least one polymeric dispersant which is incompatible with the water-soluble polymers (A) in aqueous solution.

Particularly preferred dispersions are those which contain, as component (A), homopolymers of N-vinylformamide. N-vinylformamide units and N-vinylacetamide units can be characterized with the aid of the following formula:

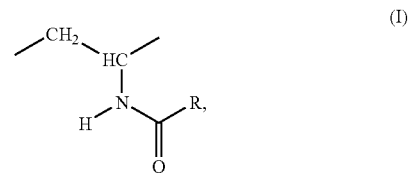

where R is H or $CH_3$.

The water-soluble polymers containing N-vinylformamide units and/or N-vinylacetamide units can, if required, contain from 1 to 80, preferably from 5 to 30, % by weight of further monomers as copolymerized units. Such monomers are, for example, monoethylenically unsaturated carboxylic acids of 3 to 8 carbon atoms, such as acrylic acid, methacrylic acid, dimethacrylic acid, ethacrylic acid, maleic acid, citraconic acid, methylenemalonic acid, allylacetic acid, vinylacetic acid, crotonic acid, fumaric acid, mesaconic acid and itaconic acid. From this group of monomers, acrylic acid, methacrylic acid, maleic acid or mixtures of said carboxylic acids are preferably used. The monoethylenically unsaturated carboxylic acids are used either in the form of the free acids or in the form of their free alkali metal, alkaline earth metal or ammonium salts in the copolymerization. For neutralization of the free carboxylic acids, sodium hydroxide solution, potassium hydroxide solution, sodium carbonate, potassium carbonate, sodium bicarbonate, magnesium oxide, calcium hydroxide, calcium oxide, gaseous or aqueous ammonia, triethylamine, ethanolamine, diethanolamine, triethanolamine, morpholine, diethylenetriamine or tetraethylenepentamine is preferably used.

Further suitable monomers are, for example, the esters, amides and nitriles of the abovementioned carboxylic acids, e.g. methyl acrylate, ethyl acrylate, methyl methacrylate, ethyl methacrylate, hydroxyethyl acrylate, hydroxypropyl acrylate, hydroxybutyl acrylate, hydroxyethyl methacrylate, hydroxypropyl methacrylate, hydroxyisobutyl acrylate, hydroxyisobutyl methacrylate, monomethyl maleate, dimethyl maleate, monoethyl maleate, diethyl maleate, 2-ethylhexyl acrylate, 2-ethylhexyl methacrylate, acrylamide, methacrylamide, N-dimethylacrylamide, N-tert-butylacrylamide, acrylonitrile, methacrylonitrile, dimethylaminoethyl acrylate, diethylaminoethyl acrylate, diethylaminoethyl methacrylate and the salts of the last-mentioned basic monomers with carboxylic acids or mineral acids and the quaternized products of the basic (meth)acrylates.

Other suitable copolymerizable monomers are furthermore acrylamidoglycolic acid, vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid and monomers containing phosphoric acid groups, such as vinylphosphonic acid, allylphosphonic acid and acrylamidomethylpropanephosphonic acid. The monomers containing acid groups can be used in the polymerization in the form of free acid groups and in a form partially or completely neutralized with bases.

Further suitable copolymerizable compounds are N-vinylpyrrolidone, N-vinylcaprolactam, N-vinylimidazole, N-vinyl-2-methylimidazole, N-vinyl-4-methylimidazole, diallylammonium chloride, vinyl acetate, vinyl propionate and styrene. It is of course also possible to use mixtures of said monomers. The said monomers when polymerized alone do not give water-soluble polymers, the polymers containing N-vinylformamide units and/or N-vinylacetamide units contain these comonomers as polymerized units only in amounts such that the copolymers are still water-soluble. In contrast to water-in-oil polymer emulsions, no organic solvents are required for the novel aqueous dispersions. As is evident from the prior art stated at the outset, concentrated solutions of inorganic salts are a conventional medium for the preparation of aqueous dispersions of water-soluble polymers. As a result, the known dispersions have a very high salt load. Novel aqueous dispersions of water-soluble polymers are in comparison virtually salt-free. The aqueous dispersions of water-soluble polymers of N-vinylformamide and/or N-vinylacetamide preferably have a high polymer content and preferably contain polymers having high molar masses in combination with low viscosity. The molar masses of the polymers containing N-vinylformamide units and/or N-vinylacetamide units are, for example, from $5 \cdot 10^4$ to $1 \cdot 10^7$, preferably from $2 \cdot 10^5$ to $1 \cdot 10^6$.

The polymeric dispersants additionally contained as component (B) in the aqueous dispersions differ in the composition from the water-soluble polymers (A) described above. The polymeric dispersant (B) is incompatible with the water-soluble polymer (A). The average molar masses of the polymeric dispersants are preferably from 1000 to 500,000, in particular from 1500 to 50,000.

The polymeric dispersant containing at least one functional group selected from ether, hydroxyl, carboxyl, sulfone, sulfate ester, amino, imino, tert-amino and/or quaternary ammonium groups. Examples of such compounds are: carboxymethylcellulose, water-soluble starch and starch derivatives, starch esters, starch xanthogenates, starch acetates, dextran, polyalkylene glycols, polyvinyl acetate, polyvinyl alcohol, polyvinylpyrrolidone, polyvinylpyridine, polyethyleneimine, polyvinylimidazole, polyvinylsuccinimide and polydiallyldimethylammonium chloride.

If the aqueous dispersions of water-soluble polymers of N-vinylcarboxamides are used in papermaking, polymeric dispersants which have further process- or product-improving properties are preferably used for the preparation of these dispersions. In this way, it is possible to offer combination solutions to the papermaker. For example, the dispersants (B) of the aqueous dispersions of water-soluble polymers of N-vinylcarboxamides can be selected from compounds which are employed in papermaking as fixing compositions, wet or dry strength agents, dispersants for inorganic solids, antiadhesion compositions for better release from rollers or detackifiers, with the result that the soft, tacky impurities of the paper stock are converted into brittle deposits. In papermaking, it is of course possible to use further process assistants together with the novel aqueous dispersions. For example, a polyacrylamide or polyethylene oxide having retention activity may additionally be used with a novel aqueous dispersion of poly-N-vinylformamide.

The aqueous dispersions contain from 1 to 50, preferably from 5 to 40, parts by weight, based on 100 parts by weight of water, or at least one of the abovementioned polymeric dispersants (B).

The present invention also relates to a process for the preparation of aqueous dispersions of water-soluble polymers of N-vinylformamide and/or of N-vinylacetamide, wherein (A) from 5 to 80 parts by weight of N-vinylformamide and/or N-vinylacetamide, if desired together with other monoethylenically unsaturated monomers which form water-soluble polymers therewith, and (B) from 1 to 50 parts by weight of at least one polymeric dispersant which is incompatible with the polymers, formed from the monomers (A), in aqueous solution, in 100 parts by weight of water, are subjected to free radical polymerization at from 30 to 95° C. in the presence of from 0.001 to 5.0% by weight, based on the monomers used, of polymerization initiators which form free radicals under the polymerization conditions.

In the preferred embodiment of the process, (A) from 10 to 50 parts by weight of N-vinylformamide and/or N-vinylacetamide, if desired together with other monoethylenically unsaturated monomers which form water-soluble polymers therewith, and (B) from 5 to 40 parts by weight of at least one polymeric dispersant which is incompatible with the polymers, formed from the monomers (A), in aqueous solution, in 100 parts by weight of water, are polymerized at from 40 to 70° C. with from 0.5 to 2.0% by weight, based on the monomers used in the polymerization, of the azocompounds which decompose into free radicals under the polymerization conditions.

The monomers are subjected to free radical polymerization according to the invention, i.e. polymerization inhibitors which form free radicals under the polymerization conditions are used. Suitable compounds of this type are, for example, hydrogen peroxide, peroxides, hydroperoxides, redox catalysts and nonoxidizing initiators, such as azocompounds which decompose into free radicals under the polymerization conditions. Such azocompounds are, for example, 2,2'-azobis(2-amidinopropane) dihydrochloride, 2,2'-azobis(N,N'-dimethyleneisobutyramidine) dihydrochloride, 2,2'-azobis(2,4-dimethylvaleronitrile), 2,2'-azobis[2-methyl-N-(2-hydroxyethyl)propionamide] or 2,2'-azobisisobutyronitrile. It is of course also possible to use mixtures of different initiators. A particularly preferred preparation process for the aqueous dispersions of water-soluble polymers is one in which (A) N-vinylformamide, if desired together with other monoethylenically unsaturated monomers, and (B) polyethylene glycol, polyvinylpyrrolidone or mixtures thereof are polymerized at from 40 to 55° C. with water-soluble azoinitiators. Suitable polymeric dispersants (B) are preferably polyethylene glycol, polypropylene glycol, copolymers of ethylene glycol and propylene glycol, polyvinyl acetate, polyvinyl alcohol, polyvinylpyridine, polyvinylimidazole, polyvinylsuccinimide, polydiallyldimethylammonium chloride, polyethyleneimine and mixtures thereof. The molar masses of these polymers are preferably from 1500 to 50,000.

If polymer dispersions and polymers having low molecular weights are desired, it is possible, for example, to increase the amounts of initiator which are usually used in the polymerization so that it is also possible to use amounts of initiator which are outside the abovementioned range for the amounts of initiator. Aqueous dispersions of low molecular weight homo- and copolymers of the suitable vinylcarboxamides can also be obtained by carrying out the polymerization in the presence of polymerization regulators and, if required, simultaneously using a larger amount of initiator than that usually required. Suitable polymerization regulators are, for example, compounds containing sulfur in bound form, such as dodecyl mercaptan, thioglycolic acid, thioacetic acid and mercaptoalcohols, such as mercaptoethanol, mercaptopropanols and mercaptobutanols. In addition, formic acid, isopropanol and hydrazine in the form of salts with strong acid may also be used as polymerization regulators.

The molecular weights of the polymers present in dispersed form can also be characterized with the aid of the K values according to Fikentscher. The K values are up to 300 and preferably in the range from 130 to 180. From light scattering experiments, it follows that a K value of 250 corresponds to an average molecular weight of the polymers of about 7,000,000 dalton.

By eliminating formyl groups from polymers containing N-vinylformamide units and by eliminating the group $CH_3$—CO— from polymers containing N-vinylacetamide units, polymers containing vinylamine units are formed in each case. Elimination may be effected partially or completely. If the hydrolysis is carried out in the presence of acids, the vinyamine units of the polymers are present as ammonium salts. The hydrolysis can also be carried out with the aid of bases, for example of metal hydroxides, in particular of alkali metal and alkaline earth metal hydroxides. Preferably, sodium hydroxide or potassium hydroxide is used. In particular cases, hydrolysis can also be carried out with the aid of ammonia or amines. In the case of the hydrolysis in the presence of bases, the vinylamine units are present in the form of free bases.

Suitable hydrolysis agents are preferably mineral acids, such as halogen halides, which may be used in gaseous form or as an aqueous solution. Concentrated hydrochloric acid, sulfuric acid, nitric acid or phosphoric acid and organic acids, such as $C_1$- to $C_5$-carboxylic acids, and aliphatic or aromatic sulfonic acid are preferably used. For example, from 0.05 to 2, in particular from 1 to 1.5, molar equivalents of acid are required per equivalent of formyl groups in the polymers containing polymerized N-vinylformamide units. Hydrolysis of the N-vinylformamide units takes place significantly more rapidly than that of the polymers having N-vinylacetamide units. If copolymers of the suitable vinylcarboxamides with other comonomers are subjected to the hydrolysis, the comonomer units contained in the copolymer can also be chemically modified. For example, vinyl alcohol units are formed from vinyl acetate units. In hydrolysis, acrylic acid units are formed from methyl acrylate units, and acrylamide or acrylic acid units are formed from acrylonitrile units. The hydrolysis of the N-vinylformamide units and/or vinylacetamide units of the polymers (A) can be carried out to an extent of from 5 to 100%, preferably from 10 to 40%. Although aqueous dispersions of water-soluble N-vinylcarboxamides dissolve on dilution with water, the dispersion is surprisingly not destroyed during hydrolysis. The particle diameter of the hydrolyzed particles before and after the hydrolysis is from 50 nm to 2 µm or preferably from 50 nm to 2 µm and in most cases from 100 to 700 nm.

The dispersions described above, i.e. the unhydrolyzed as well as the hydrolyzed aqueous dispersions of water-soluble N-vinylcarboxamides, are used as drainage aids, flocculants and retention aids and as wet and dry strength agents and as fixing compositions in papermaking. The cationic polymers can moreover be used as flocculants for wastewaters in the dewatering of sewage sludge, as flocculants in ore dressing and in tertiary oil production or as dispersants, for example, for inorganic and organic pigments, dyes, cement or crop protection agents. The unhydrolyzed as well as the hydrolyzed aqueous dispersions can moreover be used as strength agents for paper, as fixing compositions for soluble and insoluble interfering substances in papermaking and as compositions for paper coating. They can furthermore be used as coating material for fertilizers and crop protection agents and as floorcare compositions. Said aqueous hydrolyzed and unhydrolyzed polymer dispersions can also be used in cosmetics, for example for hair formulations, for example conditioners, hairsetting compositions or conditioners for skincare compositions and as thickeners for cosmetic formulations and furthermore as a component of cosmetic formulations for oral hygiene.

The K values were determined according to H. Fikentscher, Cellulose-Chemie, 13 (1932), 58-64 and 71-74, in aqueous solution at 25° C. and at a concentration which, depending on the K value range, of from 0.1 to 5% by weight. The viscosity of the dispersion was measured in each case in a Brookfield viscometer using a no. 4 spindle at 20 rpm and at 20° C. The data in % are percentages by weight.

EXAMPLE 1

800 g of water, 5 g of sodium dihydrogen phosphate dihydrate, 150 g of polyvinylpyrrolidone (K value 30, determined in 1% strength aqueous solution) and 150 g of polyethylene glycol having a molar mass of 1500 were weighed into a 2 l glass vessel equipped with an anchor stirrer, nitrogen supply line, distillation bridge and reduced pressure regulating means were all processed by stirring to give a homogeneous solution. 500 g of N-vinylformamide were added and the pH of the solution was then brought to 6.5 by adding 25% strength aqueous sodium hydroxide solution. Nitrogen was passed continuously through the reaction mixture, and a solution of 2.5 g of 2,2'-azobis-(2-aminopropane) dihydrochloride in 100 g of water was added and the reaction mixture was heated to 50° C. for polymerization. The polymerization was carried out at this temperature and 130 mbar, the resulting heat of polymerization being removed by evaporative cooling. The polymerization time was 13 hours. Within this time, water was distilled off in an amount such that an aqueous dispersion having a solids content of 44% was obtained. It had a viscosity of 15600 mPas, a K value of 140 (measured as 0.1% strength solution in 5% strength aqueous NaCl solution) and a residual N-vinylformamide monomer content of 0.1%.

EXAMPLE 2

1200 g of water, 5 g of sodium dihydrogen phosphate dihydrate, 150 g of polyvinylpyrrolidone (K value 30, determined in 1% strength aqueous solution) and 150 g of polyethylene glycol having a molar mass of 1500 were initially taken in a 2 l glass vessel equipped with an anchor stirrer, nitrogen supply line, distillation bridge and reduced pressure regulating means. The mixture was stirred, and 643 g of N-vinylformamide were added. The pH of the reaction mixture was brought to 6.5 by adding 25% strength aqueous sodium hydroxide solution. Nitrogen was passed continuously through the reaction mixture and 2.5 g of 2,2'-azobis (2-aminopropane) dihydrochloride in the form of a solution in 100 g of water were added and the batch was heated to a polymerization temperature of 50° C. The polymerization was carried out at 130 mbar, the resulting heat of polymerization being removed in the course of 13 hours by evaporative cooling and water being distilled off from the reaction mixture in an amount such that an aqueous dispersion having a solids content of 44.1% and a polyvinylformamide fraction of 25% was obtained. The viscosity of the aqueous dispersion was 5800 mPas. The K value of the polymer was 148 and the residual N-vinylformamide monomer content was 0.2%.

EXAMPLE 3

In the apparatus described in Example 1, first a solution of 1200 g of water, 5 g of sodium dihydrogen phosphate dihydrate, 150 g of polyvinylpyrrolidone (K value 30, measured in 1% strength aqueous solution) and 150 g of polyethylene glycol having a molar mass of 1500 was prepared, and then 500 g of N-vinylformamide were added and a 25% strength aqueous sodium hydroxide solution was added in an amount such that the pH of the solution was 6.5. Nitrogen was passed continuously through the solution, and an aqueous solution of 2.5 g of 2,2'-azobis-(2-aminopropane) dihydrochloride in 100 g of water was added and the mixture was heated to 50° C. The polymerization was carried out at 130 mbar in the course of 13 hours, water being distilled off for evaporative cooling in an amount such that an aqueous polymer dispersion having a solids content of 41.0% was obtained. The viscosity of the dispersion was 3075 mPa·s. The proportion of dispersed polyvinylformamide was 20%. The polymer had a K value (measured as 0.1% strength solution in 5% strength aqueous NaCl solution) of 138 and a residual monomer content of 0.2%.

EXAMPLE 4

In the apparatus stated in Example 1, the solution of 1044 g of water, 5 g of sodium dihydrogen phosphate dihydrate, 200 g of a partially hydrolyzed polyvinyl acetate having a degree of hydrolysis of 86% and 100 g of polyethylene glycol having a molar mass of 1500 was prepared and 500 g of N-vinylformamide were added while stirring. The 25% strength aqueous sodium hydroxide solution was then added in an amount such that the pH was 6.5. Nitrogen was passed through the reaction mixture, and a solution of 2.5 g of 2,2'-azobis(2-aminopropane) dihydrochloride, dissolved in 1000 g of water, was added and the reaction mixture was heated to a polymerization temperature of 50° C. The polymerization was carried out at 130 mbar over a period of 13 hours and with removal of the heat of polymerization by evaporative cooling. Water was distilled off in an amount such that an aqueous dispersion having a solids content of 36% was obtained. The polymer had a K value (measured at a polymer concentration of 0.1% in 5% strength aqueous NaCl solution) of 130 and a residual monomer content of 0.1%. The particle diameter of the dispersed particles was 200 nm.

EXAMPLE 5

In the apparatus stated in Example 1, first an aqueous solution as prepared by initially taking therein 836 g of water, 5 g of sodium dihydrogen phosphate dihydrate, 150 g of a copolymer of N-vinylcaprolactam and N-vinylmethylacetamide in a molar ratio of 1:1; having a molar mass of 45,000, and 150 g of polyethylene glycol having a molar mass of 1500, adding 500 g of N-vinylformamide while stirring and bringing the pH of the solution to 6.5 by adding 25% strength aqueous sodium hydroxide solution. Nitrogen was then passed continuously through the mixture, a solution of 2.5 g of 2,2'-azobis(2-aminopropane) dihydrochloride in 100 g of water was added and the mixture was heated to 50° C., at which the polymerization was carried out. At the same time, a pressure of 130 mbar was established, and the resulting heat of polymerization was removed by rapid cooling. For this purpose, water was distilled off over a period of 13 hours in an amount such that an aqueous polymer dispersion having a solids content of 43% was formed. The polyvinylformamide content was 26.9%. The aqueous solution had a viscosity of 8700 mPa·s. The polymer had a K value (measured in 5% strength aqueous NaCl solution at a polymer concentration of 0.1%) of 110.2 and a residual N-vinylformamide monomer content of 0.2% The particle size of the dispersed particles was 200 nm.

EXAMPLE 6

216.7 g of the aqueous polymer dispersion prepared according to Example 1 were initially taken in a 3-necked flask which had a capacity of 250 ml and was equipped with a gas inlet tube, reflux condenser and stirrer. 4 g of gaseous hydrogen chloride were passed in while stirring in the course of 10 minutes. The reaction mixture was heated to 50° C. and stirred for 5 hours at this temperature. Thereafter, the degree of hydrolysis for the polymer was 10.1%, i.e. the polymer contained 10.1% of vinylamine units. The reaction mixture was neutralized by passing in 2.2 g of ammonia gas. The pH was 7.5. The dispersion had a viscosity of 16,600 mPa·s. The mean particle size of the dispersed particles was 250 nm. The polymer had a molar mass of 900,000 daltons.

EXAMPLE 7

206 g of the aqueous dispersion prepared according to Example 3 were initially taken in a 3-necked flask having a capacity of 250 ml and equipped with a gas inlet tube, reflux condenser and stirrer. 20.3 g of hydrogen chloride gas were then passed in while stirring in the course of 25 minutes. The reaction mixture was heated to 75° C. and then stirred for 2 hours at this temperature. The degree of hydrolysis of the poly-N-vinylformamide was 75%. The dispersion had a viscosity of 7040 mPa·s. The particle size of the dispersion was 300 nm. The molar mass of the polymer was 500,000 daltons.

EXAMPLE 8

212 g of the dispersion obtained according to Example 3 were initially taken in a 3-necked flask having a capacity of 250 ml. 2.8 g of gaseous hydrogen chloride were then passed in while stirring, and the reaction mixture was heated to 50° C. The mixture was then stirred for 6.5 hours at this temperature. Thereafter, the degree of hydrolysis of the polymer was 8.5%. The aqueous dispersion had a viscosity of 4800 mPa·s. The particle size of the dispersed particles was 200 nm. The polymer had a molar mass of $1.2 \cdot 10^6$ daltons.

EXAMPLE 9

217.8 g of the polymer dispersion prepared according to Example 3 were initially taken in a 3-necked flask having a capacity of 250 ml. 8 g of gaseous hydrogen chloride were then passed in while stirring, and the reaction mixture was heated to 50° C. The mixture was then stirred for 7 hours at this temperature. Thereafter, the degree of hydrolysis of the polymer was 27.4%. The aqueous dispersion had a viscosity of 4950 mPa·s. The particle size of the dispersed particles was 370 nm and the molar mass was $1.07 \cdot 10^6$ daltons.

Use Examples

Determination of the Drainage Time

The drainage term was determined in a Schopper-Riegler-tester by draining therein 1 l of the fibrous stock suspension to be tested and in each case determining the drainage time after the passage of 700 ml of water.

Optical Transmittance of the White Water

The optical transmittance of the white water is a measure of retention of crills and fillers. It was determined with the aid of a photometer and stated in percent. The higher the value for the optical transmittance, the better is the retention. The following starting materials were used:

The polymers I and II served for comparison with the prior art.

Polymer I:

Polyamidoamine obtained from adipic acid and diethylenetriamine grafted with ethyleneamine and crosslinked with an α,ω-dichloropolyethylene glycol ether (cationic drainage aid and retention aid according to U.S. Pat. No. 4,144,123).

Polymer II:

Commercial cationic copolymer of 70% acrylamide and 30% of dimethylaminoethyl acrylate chloride, K value of the copolymer 250.

Polymer III:

Commercial cationic polyacrylamide (Praesterat® K 350)

Polymers to be used according to the invention:

Polymer IV:

Aqueous dispersion which was obtained according to Example 8 (copolymer of 91.5% of N-vinylformamide units and 8.5% of vinylamine units).

EXAMPLE 10

A pulp having a consistency of 2 g/l was prepared from deinked wastepaper, and 0.2 g/l of china clay was additionally added to the stock. The paper stock had a pH of 7. First the drainage rate and then the optical transmittance of the white water were determined. Zero value of the drainage time was 79 seconds. The polymers stated in Tables 1 and 2 were then added in amounts of 0.02, 0.04 and 0.08%, based on dry fiber, to the fiber suspension and the drainage times and the optical transmittance of the white waters were determined. The results shown in Tables 1 and 2 were determined.

| | Drainage time [s] | | |
|---|---|---|---|
| | Addition [%] 0.02 | of the polymer 0.04 | to the paper stock 0.08 |
| Polymer I | 55 | 40 | 28 |
| Polymer II | 33 | 25 | 18 |
| Polymer III | 43 | 32 | 23 |
| Polymer IV | 39 | 30 | 23 |

| | Optical transmittance [%] | | |
|---|---|---|---|
| | Addition [%] 0.02 | of the polymer 0.04 | to the paper stock 0.08 |
| Polymer I | 51 | 63 | 77 |
| Polymer II | 73 | 86 | 93 |
| Polymer III | 62 | 75 | 86 |
| Polymer IV | 67 | 74 | 83 |

We claim:

1. A process for the preparation of aqueous dispersions of water-soluble polymers of N-vinylformamide and/or of N-vinylacetamide, comprising:
    subjecting to free radical polymerization:
    (A) from 5 to 80 parts by weight of N-vinylformamide and/or N-vinylacetamide, if desired together with other monoethylenically unsaturated monomers, which form water-soluble polymers therewith; and
    (B) from 1 to 50 parts by weight of at least one polymeric dispersant which is selected from the group comprising carboxymethylcellulose, water-soluble starch, starch esters, starch xanthogenates, starch acetates, dextran, polyalkylene glycols, polyvinyl acetate, polyvinyl alcohol, polyvinylpyrrolidone, polyvinylpyridine, polyethyleneimine, polyvinylimidazole, polyvinylsuccinimide and polydiallyldimethylammonium chloride;
    in 100 parts by weight of water;
    wherein:
    the free radical polymerization is carried out at a temperature of from 30 to 95° C;
    the free radical polymerization is carried out in the presence of from 0.001 to 5.0% by weight, based on the monomers used, of polymerization initiators which form free radicals under the polymerization conditions; and
    the free radical polymerization is carried out under conditions that provide water soluble polymers having a particle size of from 1 to 10 µm.

2. A process as claimed in claim 1, wherein
    (A) from 10 to 50 parts by weight of N-vinylfromamide and/or vinylacetamide, if desired together with other monoethylenically unsaturated monomers which form water-soluble polymers therewith, and
    (B) from 5 to 40 parts by weight of at least one polymeric dispersant, in 100 parts by weight of water, are polymerized at from 40 to 70° C. with from 0.5 to 2.0% by weight, based on the monomers used in the polymerization, of azocompounds which decompose into free radicals under the polymerization conditions.

3. A process as claimed in claim 1, wherein the at least one polymeric dispersant (B) comprises at least one member selected from the group consisting of polyethylene glycol, polypropylene glycol, copolymers of ethylene glycol and propylene glycol, polyvinylimidazole, polyvinylsuccinimide, polydiallyldimethylammonium chloride, and polyethyleneimine.

4. A process as claimed in claim 1, wherein (A) N-vinylformamide, if desired together with other monoethylenically unsaturated monomers, and (B) polyethylene glycol, polyvinylpyrrolidone or mixtures thereof are polymerized at from 40 to 55° C. with water-soluble azo initiators.

5. A process as claimed in claim 2, wherein the at least one polymeric dispersant (B) comprises at least one member selected from the group consisting of polyethylene glycol, polypropylene glycol, copolymers of ethylene glycol and propylene glycol, polyvinylimidazole, polyvinylsuccinimide, polydiallyldimethylammonium chloride, and polyethyleneimine.

6. A process as claimed in claim 2, wherein (C) N-vinylformamide, if desired together with other monoethylenically unsaturated monomers, and (D) polyethylene glycol, polyvinylpyrrolidone or mixtures thereof are polymerized at from 40 to 55° C. with water-soluble azo initiators.

7. A process as claimed in claim 3, wherein (E) N-vinylformamide, if desired together with other monoethylenically unsaturated monomers, and (F) polyethylene glycol, polyvinylpyrrolidone or mixtures thereof are polymerized at from 40 to 55° C. with water-soluble azo initiators.

* * * * *